United States Patent [19]

Lassaux et al.

[11] Patent Number: 4,679,230
[45] Date of Patent: Jul. 7, 1987

[54] ECHO CANCELLER AND CENTER CLIPPER CONTROL ARRANGEMENT

[75] Inventors: Jean Lassaux, Lannion; Christian Dagorn, Perros Guirec, both of France

[73] Assignee: Telecommunications Radioelectriques et Telephoniques T.R.T, Paris, France

[21] Appl. No.: 731,640

[22] Filed: May 7, 1985

[30] Foreign Application Priority Data

May 15, 1984 [FR] France ............................. 84 07499

[51] Int. Cl.$^4$ .......................................... H04B 3/20
[52] U.S. Cl. .................................... 379/411; 370/32.1
[58] Field of Search ............... 179/170.2, 170.6, 170.8; 370/32, 32.1; 379/406, 410, 411

[56] References Cited

U.S. PATENT DOCUMENTS

| | | | |
|---|---|---|---|
| 3,894,200 | 7/1975 | Campanella et al. | 179/170.2 |
| 4,282,411 | 8/1981 | Stewart | 179/170.2 |
| 4,360,712 | 11/1982 | Horna | 179/170.2 |

OTHER PUBLICATIONS

"Echo Canceller Utilizing Pseudo-Logarithmic Coding", D. Horna, NTC '77 Conference Record, Los Angeles, Calif., Dec. 5-7, 1977, pp. 379-406.
"Report of the Working Party on Voice Processing", International Telegraph and Telephone Consultive Committee, Study Group XV-Report No. R24, pp. 16-22, Jan. 1983.

*Primary Examiner*—Gene Z. Rubinson
*Assistant Examiner*—R. Vaas
*Attorney, Agent, or Firm*—Leroy Eason; Anne E. Barschall

[57] ABSTRACT

This arrangement is intended to control the operation of the coefficients adjusting circuit (12) of an echo canceller and of the operation of a center clipper (15) inserted in the send path (7) of a four-wire circuit at the output of the subtractor (13) of the echo canceller for suppressing there, when it is set to its active state, the signals whose amplitude is lower than or equal to a clipping threshold. The control arrangement operates on the basis of the signal in the receive path (2) of the four-wire circuit, the level $N_{REC}$ of this signal and the levels $N_{AV}$ and $N_{AP}$ of the signals before and after the subtractor (13). It comprises a controller (21) for comparing the level $N_{AV}$ to two fixed thresholds $N_{AV0}$, $N_{AV1}$ and for comparing the ratio $N_{AP}/N_{AV}$ to a threshold a which is capable of varying as a function of $N_{AV}$, the center clipper being only set to its active state when the level $N_{AV}$ is comprised between $N_{AV0}$ and $N_{AV1}$ and the ratio $N_{AP}/N_{AV}$ is below a threshold a, the clipping threshold varying in accordance with an increasing function of the level $N_{AV}$.

18 Claims, 8 Drawing Figures

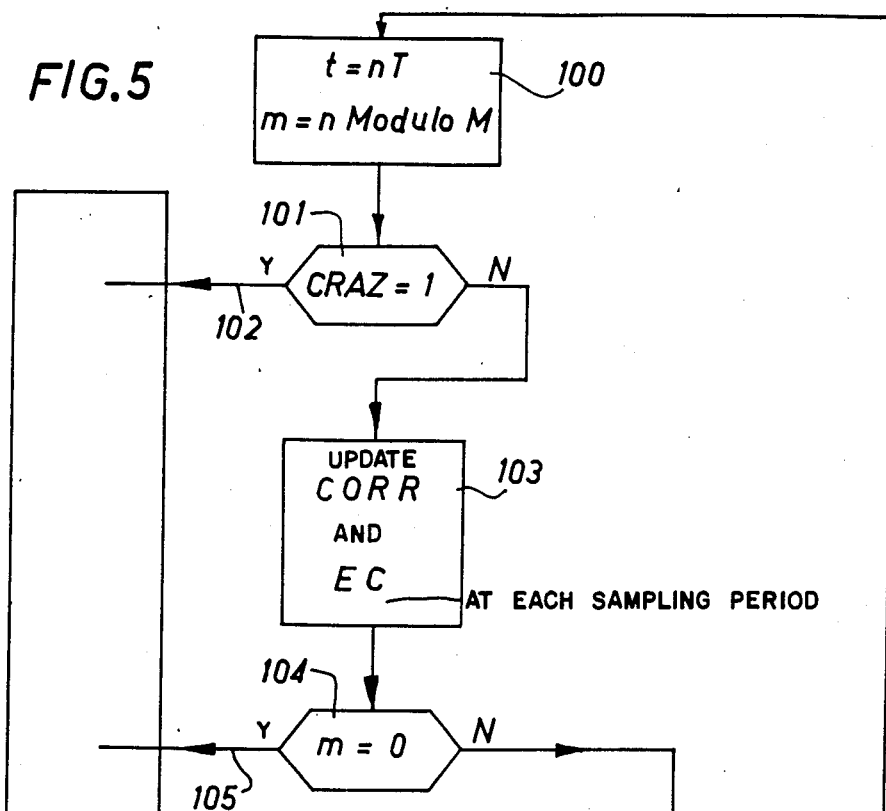
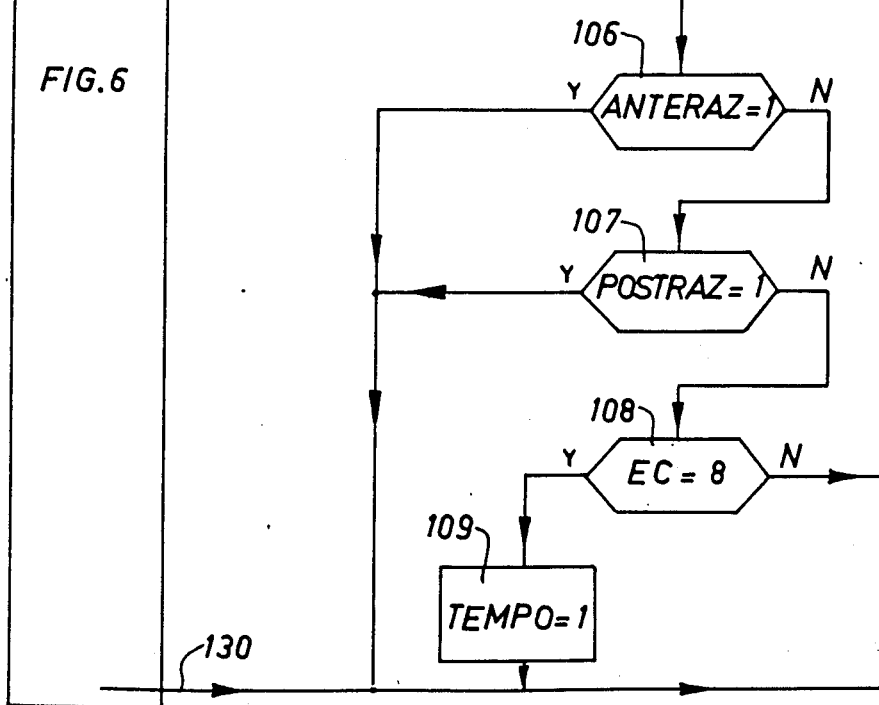
FIG. 5
FIG. 6

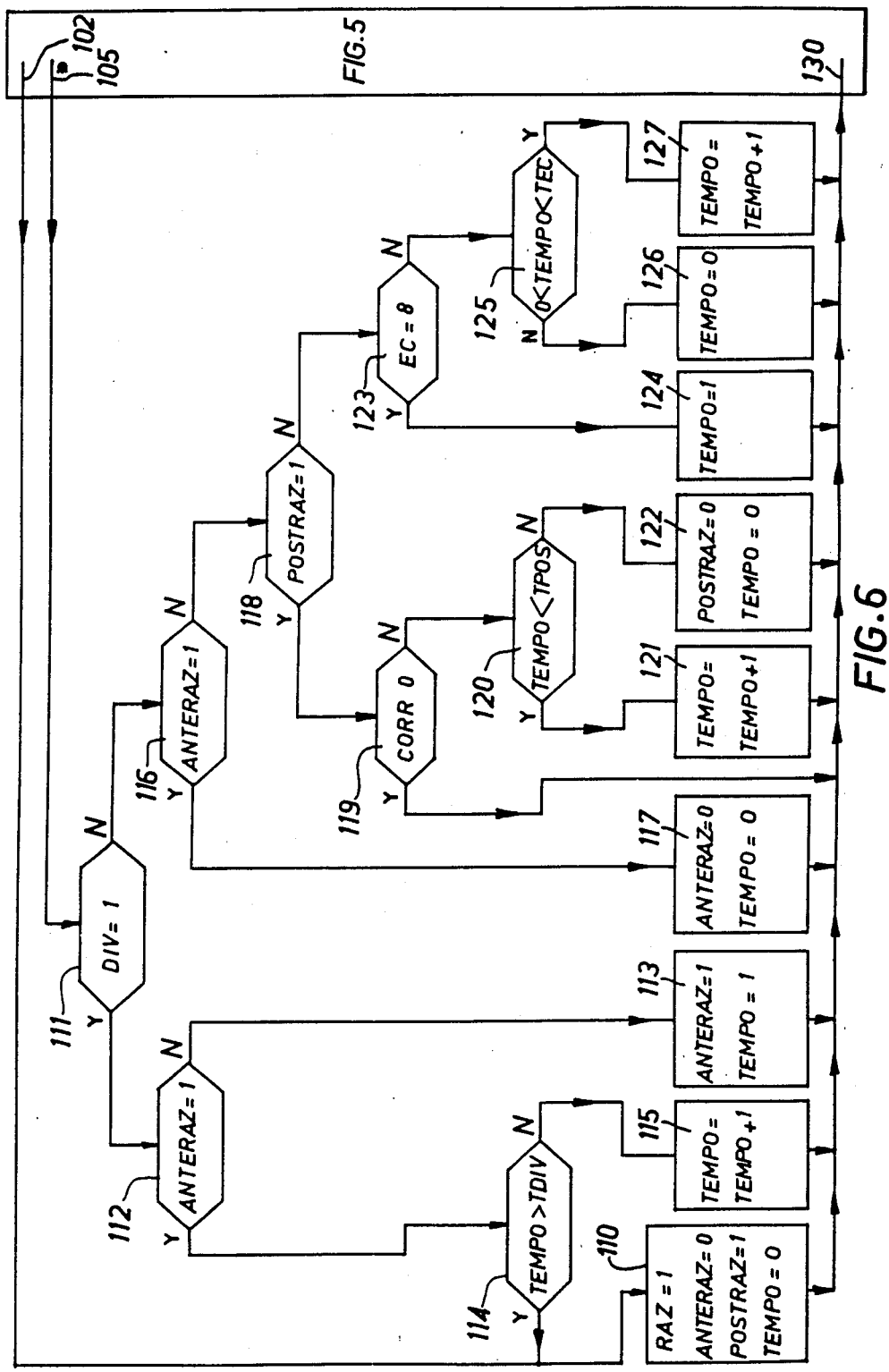

ECHO CANCELLER AND CENTER CLIPPER CONTROL ARRANGEMENT

BACKGROUND OF THE INVENTION

1. Field of the Invention

The invention relates to an arrangement for controlling an echo canceller and a centre clipper inserted in a telephone circuit comprising a receive path and a send path in which an echo signal may be generated by a signal entering the receive path. The echo canceller comprises an adaptive filter connected to the receive path; a subtractor arranged in the send path for subtracting the output signal of the adaptive filter from the signal in the send path; and an adjusting circuit for automatically adjusting the coefficients of the filter so the filter supplies an approximated value of the echo signal. The centre clipper is arranged in the send path at the output of the subtractor for suppressing there, when it is activated, signals having an amplitude equal to or below a clipping threshold. The coefficient adjusting circuit and the centre clipper operate under the control of said control arrangement, which forms control signals from the signal in the receive path and the level $N_{REC}$ of this signal and from the levels $N_{AV}$ and $N_{AP}$ of the signals in the send path, respectively before and after the subtractor.

2. Description of the Related Art

In the above-described echo canceller, the adaptive filter has for its object to supply as accurate a copy as possible of the echo signal appearing in the send path of a four-wire circuit, in response to the signal generated by a distant talker in the receive path and passing through an unwanted echo path between the receive and send paths. When the echo path does not comprise non-linear circuits capable of generating noise, the adaptive filter may form, after an adaption period, an echo copy signal which in practice enables the cancellation of the echo signal at the output of the subtracting circuit. But in certain cases, the echo path may be the seat of cascaded non-linear operations such as analog-to-digital conversions or PCM-to-differential PCM conversions and vice versa. In such cases, the accumulated quantization noise in the echo path degrades the operation of the adaptive filter for low levels of the echo signal and produces a prohibitive residual echo level at the output of the subtractor. This occurs, for example, in the case of long-distance links via satellites in which an echo canceller is provided near a ground station for cancelling an echo generated by an imperfection in a two-wire-to-four-wire transition located anywhere in a nation.

To obtain an attenuation of the residual echo which the actual echo canceller cannot suppress, the CCITT recommends to arrange in the send path, at the output of the subtractor, a non-linear processing circuit which is often referred to as a centre clipper: see on this subject Recommandation G. 165 and Report R.24, appendix 3, of Study Group XV. The centre clipper is a circuit which nearly suppresses the signals having an amplitude equal to or below a clipping threshold and transmits the signals having an amplitude above this threshold. The centre clipper associated with an echo canceller has for its object to suppress the residue of the echo not eliminated by the echo canceller in single talk conditions of the distant talker so as to ensure that the latter does not hear his own echo and to disturb to the least possible extent the near talker speech signal to be transmitted via the send path.

Associated with the centre clipper is a control circuit continually to adjust the clipper continually to the state most suitable for performing its function, namely: to an active state when only a residue of the echo is present at its input, and to an inactive state corresponding to the transmission of all the signals in all the other situations, more specifically in double talk periods or when the echo is insufficiently eliminated by the echo canceller. To fulfill these conditions correctly, the centre clipper must respond rapidly to all changes in the conditions.

The operation of the coefficient adjusting circuit is also controlled by a control circuit, essentially: for authorizing the correction only when the output signal of the subtractor (error signal controlling the correction) is significant relative to the receive signal level; for disabling the correction in double talk conditions; for setting the coefficients to zero after divergence of the coefficients has been detected; and, possibly, for instantaneously increasing the correction step after the coefficients have been set to zero.

In certain types of known echo cancelling arrangements (see, for example, the article by Horna published in COMSAT Technical Review, Vol. 7 No. 2, 1977, pages 393–428), the control of the centre clipper is of a design similar to the control circuit of arrangements known as "echo suppressers" and is realized independently of the echo canceller. This control is based on the comparison between the level $N_{REC}$ of the signal in the receive path and the level $N_{AV}$ at the input of the send path. When the level ratio $N_{REC}/N_{AV}$ is high, it is assumed that only the distant talker is speaking and producing an echo to be eliminated, therefore the centre clipper is made operative. When this ratio falls below a threshold, it is assumed that only the near talker is speaking or that a double talk condition exists, therefore the centre clipper is adjusted to the inactive state. The weak point of this criterion resides in the fact that the signal from the distant talker, present in the receive path, produces at the input of the send path an echo which may be variably delayed according to the echo path. When the signal from the distant talker decreases (at the end of each syllable), a significant echo may still be present in the send path, so that the ratio $N_{REC}/N_{AV}$ gives the false impression that a double talk condition exists which makes the centre clipper inoperative at an inopportune moment. To try and remedy this shortcoming, one might delay switching the centre clipper from its active to its inactive state. This will, however, result in a degradation of the speech signal from the near talker when this talker wants to break in on the conversation during said delay. Finally, when the ratio $N_{REC}/N_{AV}$ is used, it is only possible to detect strong double talk and the near speech signal will be distorted in weaker double talk conditions.

In an echo cancelling arrangement described in European Patent No. 0 053 202, some of the above-mentioned shortcomings are obviated by also taking into account the level $N_{AP}$ of the signal after the subtractor of the echo canceller, whilst the control of the centre clipper is combined with the control of the coefficients adjusting circuit. These controls are determined by a simple logic combination of three criteria which are obtained by respectively comparing the three ratios $N_{AV}/N_{REC}$, $N_{AP}/N_{REC}$ and $N_{AP}/N_{AV}$ with three thresholds. A disadvantage of this system is its lack of flexibility. Thus the three above-mentioned thresholds, which determine the operation of the echo canceller and also of the centre clipper, must be fixed at values which are chosen as a compromise and which may be detrimental in certain circumstances to the correct operation of the echo canceller. Similarly, the combinatorial character of the control logic makes it difficult to provide appropriate temporizing of certain controls, which may be vary useful in certain circumstances.

SUMMARY OF THE INVENTION

The present invention has for its object to provide a control arrangement in which the shortcomings of the prior art arrangements are obviated and which allows a very fine and flexible control of the centre clipper and the echo canceller.

According to the invention, this control arrangement comprises means for comparing the level $N_{AV}$ to two fixed levels $N_{AV0}$, $N_{AV1}$; for comparing the ratio $N_{AP}/N_{AV}$ to a threshold a which can vary as a function of the level $N_{AV}$, the control signal activating the centre clipper only when the level $N_{AV}$ is between $N_{AV0}$ and $N_{AV1}$ and when the level $N_{AP}/N_{AV}$ is lower than said threshold a; and for varying the clipping threshold in accordance with an increasing function of the level $N_{AV}$.

Preferably, means are provided for comparing the level $N_{AV}$ to several fixed levels comprised between $N_{AV0}$ and $N_{AV1}$ so as to form a plurality of consecutive ranges for the level $N_{AV}$, a non-zero clipping threshold being assigned to each range. The control signal for the centre clipper supplies a zero clipping threshold, when the centre clipper must be inactivated; and and a non-zero clipping threshold value depending on the range to which the level $N_{AV}$ belongs, when the centre clipper must be activated.

In practice, it is advantageous to delay activating the centre clipper for a predetermined period of time, for example on the order of 100 ms.

In a particularly advantageous embodiment, the control circuit according to the invention utilizes the same blocks but in smaller numbers, to control the echo canceller and the centre clipper. This embodiment applies to the control of an echo canceller and a centre clipper included in a telephone circuit which transmits compressed PCM signals. The echo canceller comprises an input converter for converting the compressed signal S'(n) entering the send path into a linear signal S(n) and an output converter for converting the linear signal R(n) produced by the subtractor into a compressed signal R'(n) to be applied to the centre clipper. In accordance with this embodiment, the input converter is also utilized in time-sharing for converting the compressed signal X'(n) in the receive path into a linear signal X(n). The converted linear signals S(n), X(n) and the linear signal R(n) produced by the subtractor are applied in time-sharing to a calculating unit comprising a random-access memory for forming a recursive filter which supplies the level signals $N_{REC}$, $N_{AV}$, $N_{AP}$ these signal levels are applied in time-sharing with the signal R(n) to said output converter which supplies the compressed signal R'(n) and the compressed signal levels $N'_{REC}$, $N'_{AV}$ and $N'_{AP}$ to a level comparison unit.

BRIEF DESCRIPTION OF THE DRAWINGS

The following description given by way of example and considered in conjunction with the accompanying drawings will clarify how the invention can be put into effect. In these drawings:

FIGS. 5 and 6 represent portions of a flow chart describing the operation of a control circuit in accordance with the invention;

DESCRIPTION OF THE PREFERRED EMBODIMENTS

Figure 1:
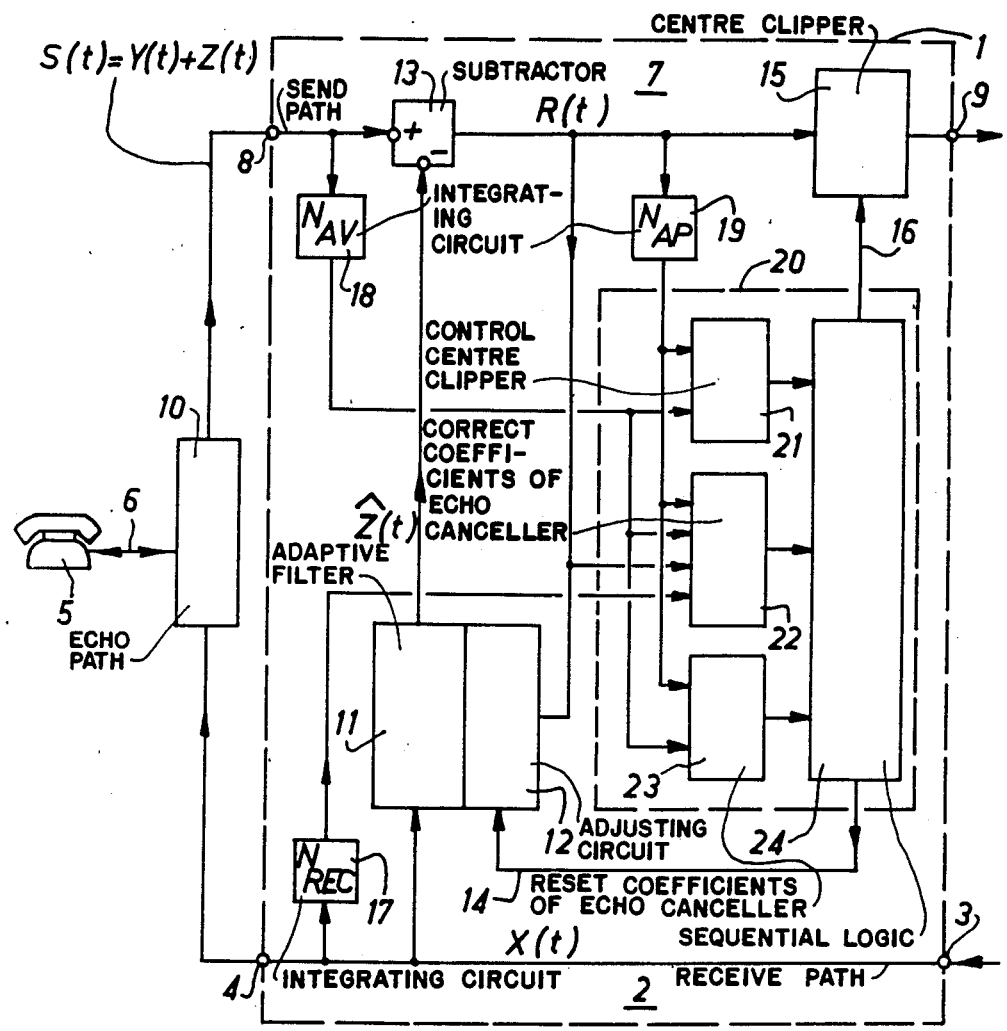
FIG. 1 is a block diagram showing an echo canceller and a centre clipper associated with the control arrangement of the invention.

FIG. 1 shows an echo canceller arrangement 1 included in the four-wire portion of a telephone transmission circuit which can transmit, for example, PCM encoded signals, each PCM path being sampled at the rate 1/T=8 kHz. For the sake of simplicity, the necessary timing circuits and signals are not shown, neither are the converters for converting the PCM signal into a linear signal and vice versa which may be necessary. The arrangement can be located near, for example, a terrestrial station in a long-distance connection via satellite. The four-wire circuit comprises a receive path 2 whose input port 3 receives the speech signal X(t) from a distant talker via the satellite path. This signal must be transmitted via the output port 4 of the receive path to a near talker in the national territory whose telephone set, denoted by reference numeral 5, is connected via a two-wire circuit 6. At its input port 8 the send path 7 of the four-wire circuit receives the signal S(t) which, in the absence of echo, is the speech signal Y(t) of the near subscriber, which signal must be transmitted via the output port 9 of the send path to the telephone set of the distant subscriber. Because of imperfections in the connection between the four-wire circuit 2, 7 and the two-wire circuit 6 of the near subscriber, these imperfections being more specifically produced by the two-wire-to-four-wire coupling circuit nearest to the near subscriber, the signal X(t) from the distant subscriber generates at the input port 8 of the send path a parasitic echo signal Z(t) which may be added to the speech signal Y(t) of the near speaker and be transmitted via the output port 9 to the telephone set of the distant subscriber.

The trajectory of the echo signal is represented by the rectangle 10 connected between the ports 4 and 8 of the four-wire circuit and also to the two-wire circuit 6 of the near subscriber.

A prior art arrangement, which has for its object to cancel the echo signal Z(t) in the send path, is an echo canceller comprising an adaptive filter 11 whose input is connected to the receive path 2. This filter comprises delay means for storing N consecutive samples of the signal X(t) of the receive path produced during a period NT which is at least equal to the duration of the impulse response of the echo path, T being the sampling period.

The filter 11 also comprises calculating means for effecting a convolution operation between the above-mentioned samples of the signal X(t) and N coefficients to be adjusted automatically with the aid of an adjusting circuit 12 so as to be in practice equal to the samples of the impulse response of the echo path during the period NT. If so, the signal $\hat{Z}(t)$ supplied by the filter 11 is an almost accurate copy of the unwanted echo signal Z(t). To cancel this echo, a subtractor 13 is used, the positive terminal of which is connected to the input port 8 of the send path, the negative terminal of which is connected to the output of the filter 11 and the output terminal of which supplies the signal R(t). This signal R(t) is used in the circuit 12 for adjusting the coefficients of the filter 11. Thus, a control loop is realized which generally operates by successive iterations, each producing a positive or a negative coefficient correction step. After a predetermined number of iterations, the coefficients converge towards their ideal values and the signal R(t) is practically free from echo. R(t) is almost zero in the silent period of the near subscriber and almost equal to the signal Y(t) in the speech periods of the near subscriber.

On the other hand, to allow only a deliberate correction of the coefficients, to prevent this correction, to reset the coefficients to zero and to accelerate the correction in diverse circumstances, the coefficient adjusting circuit receives via a connection 14 a control signal which is produced in a manner which will be explained in the sequel.

However, the foregoing echo canceller can only correctly cancel the echo when no non-linear operations have been effected in the echo path 10. As this echo path can be rather long in a national territory, several signal conversions of a non-linear type can be effected therein, which would generate an unwanted quantization noise and cause a disturbing residual echo level in the signal R(t).

Figure 2:
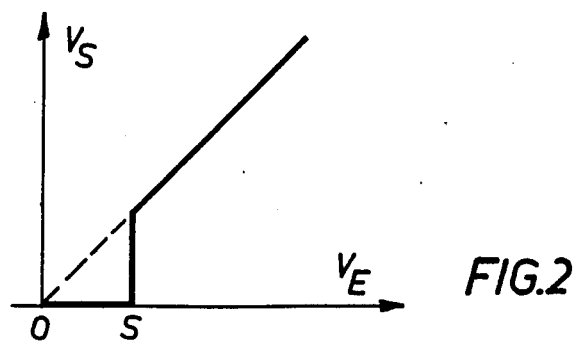
FIG. 2 is a diagram showing the transfer function of the centre clipper.

To bring this residual echo signal to a very low and non-disturbing level, the solution recommended by the CCITT is to provide in the send path, after the output of the subtractor 13, a centre clipper 15 which in its active state performs a non-linear operation in accordance with the transfer function shown in FIG. 2. According to FIG. 2, for all input signals having an amplitude $V_E$ equal to or less than the clipping threshold S the output signal has zero amplitude $V_S$. The input signals having an amplitude $V_E$ above the threshold S are transmitted to the output without modification. In its inactive state the centre clipper must transmit all the signals without modifications (as indicated by the dashed line in FIG. 2).

The centre clipper receives via a connection 16 a control signal which is essentially intended to adjust the centre clipper to its active state only when at the output of the subtractor 13 there is a residual echo not eliminated by the echo canceller, and is adjusted to its inactive state in all other circumstances.

In certain known echo cancelling arrangements (see for example the above-mentioned article by Horna), the centre clipper is controlled independently of the echo canceller without benefiting from the information supplied by the latter; in practice, the centre clipper is controlled by comparing the level $N_{REC}$ in the receive path and the level $N_{AV}$ at the input of the send path, these levels $N_{REC}$ and $N_{AV}$ being supplied by integrating circuits 17 and 18. These arrangements have more specifically the drawback of incorrectly detecting double talk conditions for which the centre clipper must be inoperative.

The arrangement disclosed in European Patent No. 0 035 202 utilizes for the control of the centre clipper and the echo canceller the two levels $N_{REC}$ and $N_{AV}$ and in addition the level $N_{AP}$ of the signal in the send path after echo cancellation effected by the subtractor 13, this level $N_{AP}$ being produced by an integrating circuit 19. Said arrangement has the disadvantage that it utilizes the same criteria (with a combinatorial logic) for the control of the centre clipper and the echo canceller, which does not enable an optimum control for these two arrangements.

The present invention provides a control arrangement 20 which effects the control of the centre clipper and the echo canceller with the aid of distinct decision criteria. In accordance with the functional representation shown in FIG. 1, the information required for making the control decisions for the centre clipper is formed in block 21 from the levels $N_{AV}$ and $N_{AP}$, the information required for making the control decision for the correction of the coefficients of the echo canceller is formed in block 22 from the levels $N_{AV}$, $N_{AP}$, $N_{REC}$ and from the signal R(t), and finally the information required for making the decision to reset these coefficients to zero is formed in block 23 from the levels $N_{AV}$ and $N_{AP}$. From the information obtained in blocks 21, 22 and 23, a sequential logic 24 produces the control signal applied via the connection 16 to the centre clipper and the control signal applied via the connection 14 to the coefficients adjusting circuit 12. In accordance with an advantageous embodiment of the control arrangement, which will be described hereinafter, the functions shown separately in blocks 21, 22 and 23 may be realized in practice by using the same calculating circuits and the same memories.

Now the decision criteria employed in the arrangement according to the invention for controlling the centre clipper will be described in greater detail.

Figure 3:
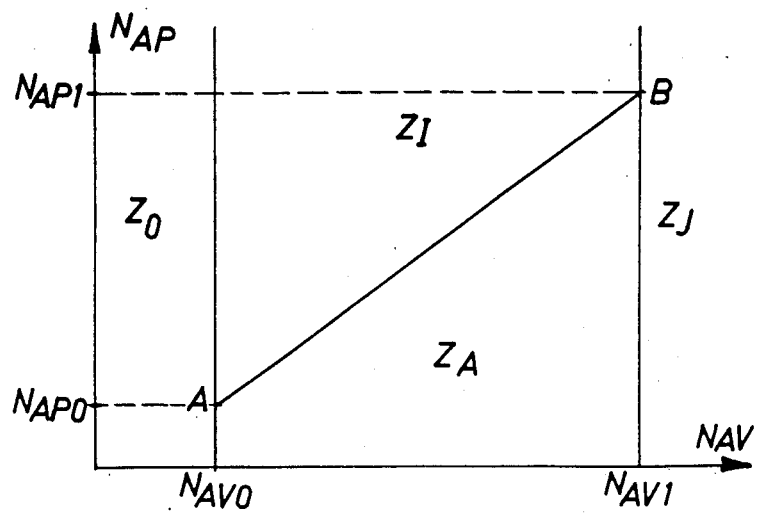
FIG. 3 is a diagram which in a system of coordinates $N_{AV}$, $N_{AP}$ shows zones in which the centre clipper must be controlled for being adjusted to an active or an inactive state.

The decision to enable the centre clipper is based on the values of the level $N_{AV}$ and on the ratio $N_{AP}/N_{AV}$, in accordance with the diagram shown in FIG. 3. In this diagram the levels $N_{AV}$ and $N_{AP}$, expressed in dBmO, are plotted at the abscissa and at the ordinates, respectively. In the zone $Z_O$, for which the level $N_{AV}$ is below a fixed level $N_{AVO}$, the centre clipper must be adjusted to its inactive state. For the values of the level $N_{AV}$ comprised between the two fixed levels $N_{AVO}$ and $N_{AV1}$, the centre clipper must be controlled such that it is adjusted to an active or an inactive state depending on the values of the ratio $N_{AP}/N_{AV}$ with respect to a threshold a which can vary as a function of $N_{AV}$. For a more accurate definition of this threshold a, the point A having coordinates ($N_{AVO}$, $N_{APO}$) and the point B having coordinates ($N_{AV1}$, $N_{AP1}$) are defined. When the point having coordinates ($N_{AV}$, $N_{AP}$) is located in the zone $Z_A$ below the segment AB, the centre clipper must be adjusted to the active state (low values of the ratio $N_{AP}/N_{AV}$). When the point ($N_{AP}$, $N_{AV}$) is located in the zone $Z_I$ above the segment AB, the centre clipper must be adjusted to its inactive state. Finally, in the zone $Z_J$ for which the level $N_{AV}$ is above the fixed level $N_{AV1}$, the centre clipper must be driven to its inactive state. Moreover, the control arrangement according to the invention must apply to the centre clipper a control signal which, in the active zone $Z_A$, causes the clipping threshold S to vary in accordance with an increasing function of the level $N_{AV}$. In the zones in which the centre clipper must be inoperative, it is sufficient for the control signal to be such that the threshold S is equal to zero.

With a centre clipper controlled as described above, a good suppression of the residual echo is obtained in the required conditions, whilst the transmission of the speech signal of the near talker is disturbed to the least possible extent. Actually, the value of the level $N_{AV}$ is a parameter defining the usefulness of the activation of the centre clipper: if the level $N_{AV}$ is too low (less than $N_{AV0}$), the centre clipper has no useful purpose as the level of the residual echo at the output of the echo canceller is imperceptible; if the level $N_{AV}$ is too high (higher than $N_{AV1}$), the signal on the send path exceeds the loading capacity of the digital PCM transmission (occurrence of non-linearities). On the other hand, the centre clipper must only be made operative in the presence of single talk of the distant talker and in an advanced convergence state of the echo canceller (the centre clipper cannot perform its function if the echo attenuation provided by the echo canceller is not sufficient). These two conditions are characterized by a low ratio $N_{AP}/N_{AV}$ (less than the threshold a). As soon as one of these conditions is not satisfied (double talk or insufficient convergence state), the ratio $N_{AP}/N_{AV}$ increases instantaneously, as the levels $N_{AP}$ and $N_{AV}$ after and before the echo canceller do not exhibit any delay relative to each other. The centre clipper can then be immediately rendered operative, which avoids temporizing problems occurring in known centre clippers when they detect double talk. Finally, because of the fact that in the embodiment according to the invention the clipping threshold S is caused to vary in accordance with an increasing function of the level $N_{AV}$, it is possible, using a judiciously chosen variation law, to limit the action of the centre clipper to only what is strictly necessary and to reduce thus certain harmful effects of the centre clipper to a very large degree.

The coordinates of the point A and B in the diagram of FIG. 3, which define the variable threshold a of the ratio $N_{AP}/N_{AV}$ in the internal ($N_{AV0}/N_{AV1}$), can be chosen such as to enable the finest possible detection of any intervention of the near talker and to eliminate the residual echo in all single talk conditions during a conversation. It is, for example, possible to choose for the points A the coordinates $N_{AV0} = -40$ dBmO and $N_{AP0} = -52$ dBmO, which corresponds to a ratio $N_{AP0}/N_{AV0} = -12$ dB. For point B, the coordinates might be $N_{AV1} = -4$ dBmO and $N_{AP1} = -18$ dBmO, which corresponds to a ratio $N_{AP1}/N_{AV1} = -14$ dB.

To have the clipping threshold S of the centre clipper vary as a function of the level $N_{AV}$, it is sufficient in practice to divide the interval $N_{AV0}, N_{AV1}$, in which the centre clipper must be activated into several ranges of level $N_{AV}$, with a clipping threshold assigned to each range. How the simultaneous control of the action of the centre clipper and the clipping threshold can be effected in a simple way, can be explained with reference to the diagram of FIG. 4. In this diagram in which the diagram of FIG. 3 is partly reproduced, the zone $Z_0$ where the centre clipper must be adjusted to the inactive state and a zone $Z_8$ including the zones $Z_I$ and $Z_J$ where the centre clipper must be adjusted to the inactive state, are found again. But the active zone $Z_A$ of the centre clipper is divided into seven zones $Z_1$ to $Z_7$ characterized by increasing values of the level $N_{AV}$. Non-zero and increasing clipping threshold values are assigned to each of these zones $Z_1$ to $Z_7$. At the instant at which the decision to activate the centre clipper is made, the clipping threshold S is fixed as a function of the zone corresponding to the point having coordinates $N_{AV}, N_{AP}$.

The following Table I shows by way of example the values of the level $N_{AV}$ limiting the zones $Z_1$ to $Z_7$, and opposite them the possible values for the clipping threshold.

TABLE I

| $N_{AV}$ (dBmO) | Zone | Clipping threshold (dBmO) |
| --- | --- | --- |
| $-40 < \ldots < -34$ | $Z_1$ | $-44$ |
| $-34 < \ldots < -30$ | $Z_2$ | $-40$ |
| $-30 < \ldots < -26$ | $Z_3$ | $-36$ |
| $-26 < \ldots < -22$ | $Z_4$ | $-32$ |
| $-22 < \ldots < -18$ | $Z_5$ | $-28$ |
| $-18 < \ldots < -14$ | $Z_6$ | $-24$ |
| $-14 < \ldots < -4$ | $Z_7$ | $-20$ |

If the point having coordinates ($N_{AP}, N_{AV}$) belongs to one of the zones $Z_0$ or $Z_8$, the centre clipper must be rendered inactive and, as has already been mentioned in the foregoing, this can be obtained by fixing the clipping threshold at the zero value. In the example of seven zones $Z_1$ to $Z_7$ corresponding to non-zero clipping thresholds, the overall control of the centre clipper can then be effected with a three-bit number by means of which it is possible to control eight different clipping thresholds, one of which has zero value.

Finally, in practice it has proved to be advantageous that, if a single talk condition associated with a convergence of the echo canceller is detected when the centre clipper is in the inactive state defined by the zone $Z_8$ (double talk condition or a condition in which the echo canceller has not converged), adjusting the centre clipper to an active state defined by one of the zones $Z_1$ to $Z_7$ is delayed by a time having a value of the order one hundred ms. This delay ensures a true return to the single talk condition and allows the echo canceller the time to return to an advanced convergence state.

The decision criteria for controlling the coefficient adjusting circuit of the echo canceller will now be described. This control comprises three separate operations.

In a first operation, correcting the coefficients at a sampling instant nT (n being an integer defining the sampling instant) is not allowed until the sample R(n) of the signal R(t) supplied by the echo canceller, which defines the amplitude of the correction of each coefficient, is higher than a predetermined minimum level and is significant relative to the level $N_{REC}$ of the signal in the receive path. Actually, the coefficients of the echo canceller must not be modified on the basis of calculation or quantization noise. These two conditions for the correction of the coefficients can be expressed by the relations:

$$R(n) > R_o \quad (1)$$

$$R(n)/N_{REC} > b \quad (2)$$

where $R_o$ is a constant defining a minimum level, and b is a constant which in practice is determined on the basis of the calculation noise introduced by the filter of the echo canceller.

In addition, when the signals processed by the echo cancelling arrangement are PCM encoded signals, the correction of the coefficients is not authorized until the level of the receive signal is in a range ($N_1, N_2$) which permits, as regards the quantization noise introduced by the PCM encoding, a constant signal-to-noise ratio, in order to limit the correction error which is proportional to the quantization noise with which the receive signal is afflicted. This condition authorizing the correction of the coefficients is expressed by the relation:

$$N_{REC0} < N_{REC} < N_{REC1} \quad (3)$$

Finally, the correction of the coefficients is inhibited at instants of strong double talk which is expressed by a level $N_{AV}$ at the input of the send path that is significant relative to the level $N_{REC}$ in the receive path, and by a level $N_{AP}$ of the same order as the level $N_{AV}$. Thus, even in the presence of a very weak echo cancellation (obtained after some dozens of mS after initialization of the coefficients), no incorrect detection of double talk X(n) occurs. The coefficients inhibiting condition can be represented by the two relations:

$$N_{AV}/N_{REC} < c$$

$$N_{AP}/N_{AV} > d \quad (4)$$

where c is equal to, for example $-5$ dB, and d is equal to, for example, $-3$ dB.

Preventing the correction of the coefficients may also be governed by an external control.

A second action consists in briefly speeding up the correction of the coefficients after these coefficients have been reset to zero. Actually, after such a reset-to-zero operation, it is important for the echo canceller to effect the fastest possible attenuation of the echo so that the distant talker hears his own echo for the shortest possible period of time. Thus, an accelerated correction of the coefficients is effected by giving the correction amplitude a value which is higher than the normal operating value, as soon as possible after the coefficients have bee reset to zero during a limited period of time TPOS.

Finally, a third action consists in resetting the coefficients to zero after a divergence of the coefficients has been detected during a time TDIV. This action has for its object to prevent the echo canceller from amplifying the echo in the case of misadaption caused, for example, by a sudden change in the echo path. At the end of this reset-to-zero operation, the correction of the coefficients is effected in an accelerated mode, as has already been explained in the foregoing, for rapidly forming new adapted coefficients. It will be clear that a divergence of the coefficients can be detected by comparing the levels $N_{AP}$ and $N_{AV}$. A coefficient divergence state is detected when $$N_{AP}/N_{AV} > 1 + \epsilon \quad (5)$$

$$N_{AV} > N_{AV0} \quad (6)$$

where $\epsilon$ is small compared to 1 and $N_{AV0}$ is equal to, for example, $-40$ dBmO.

Resetting the coefficients to zero may also be governed by an external control.

The criteria to be used for the control decision of the centre clipper and the coefficients adjusting circuit, formed in blocks 21, 22, 23 are applied to a sequential logic 24, the whole assembly cooperating in accordance with the functions described by the flow charts of FIGS. 5 and 6 for producing six distinct types of information signals which can be split up as follows:

Four output types of information signal, namely:

The binary information signal CORR which enable or inhibits correction of the coefficients of the echo canceller as a function of criteria defined by the formulae (1) to (4). The information CORR is updated in each sampling period of a digital telephone circuit (T=125 μs).

The binary information signal POSTRAZ which enables or inhibits accelerated correction of the coefficients, in the above-described circumstances. The information POSTRAZ is updated with a periodicity MT (for example M=64 and MT=8 mS).

The binary information signal RAZ which enables or inhibits resetting the coefficients to zero. This information may be obtained from an external control signal CRAZ or after a divergence of the coefficients has been detected (DIV=1 when conditions (5) and (6) are satisfied) during a time TDIV. The information RAZ is updated in each sampling period. The information signals CORR, POSTRAZ, RAZ are transmitted via the connection 14 to the coefficients adjusting circuit 12 of the echo canceller.

The information signal EC utilized to control the centre clipper is updated in each sampling period. In the example illustrated by the diagram of FIG. 4 which will be used in the further course of the description, 9 possible zones $Z_0$ to $Z_8$ are defined for the point having coordinates $N_{AV}$, $N_{AP}$. The information EC then is an integer whose values, ranging from 0 to 8, correspond to the respective zones $Z_0$ to $Z_8$. If the information EC is represented with 4 bits, its three least significant bits are sufficient for the control of the centre clipper which must be adjusted to the active state for the zones $Z_1$ to $Z_7$ and to the inactive state for the zones $Z_0$ and $Z_8$. These three least significant bits of EC are transmitted to the centre clipper via the connection 16. The most significant bit of the information EC is sufficient to indicate the EC=8 (point $N_{AV}$, $N_{AP}$ associated with zone $Z_8$) and is only used for the internal operation of the sequential logic.

Two information signals for internal use, namely:

The binary information signal ANTERAZ which indicates a divergence predetection state. Put more accurately, the information ANTERAZ goes to the 1 state as soon as DIV=1 and to the 0 state at the end of the time period TDIV; at that instant the information RAZ goes to the 1 state. The information ANTERAZ is updated with a periodicity MT.

The information TEMPO used to provide the different useful delays for forming the control information signals, that is to say the time period TDIV (time of divergence necessary for controlling the coefficients reset-to-zero operation), the time period TPOS (accelerated coefficient correction time), the time period TEC (delaying the control information EC for the centre clipper when it must change from the inactive state defined by the zone $Z_8$ to the active state defined by the zones $Z_1$ to $Z_7$).

As will become clear from the description of the flow charts of FIGS. 5 and 6, the information TEMPO formed in a counter generally occurs with a periodicity MT; it can be incremented from a value equal to zero to, for example, a maximum value of 15 and be reset thereafter to zero, which makes it possible to effect delays up to 128 ms in the above-mentioned example.

The information TEMPO is of a specific importance for the control of the centre clipper because it is provided for forming the control information EC. The information TEMPO has a non-zero value for all conditions defined by the zones $Z_0$ and $Z_8$, that is to say all those conditions which do not correspond to a single talk condition associated with a convergence condition of the echo canceller. For the time in which the information TEMPO has non-zero value, the three least significant bits of EC are forced to zero (inactive state of the centre clipper). As soon as a double talk condition or an echo canceller divergence condition is detected (which condition corresponds to the zone $Z_8$) the information TEMPO is set to 1, this may occur at each period T. Thereafter, when a single talk condition associated with an echo canceller convergence condition is detected (which condition corresponds to the zones $Z_1$ to $Z_7$), the information TEMPO is incremented every MT seconds up to a value 15, before being thereafter reset to zero. Thus, setting the centre clipper to the active state has been delayed by a period of time TEC = 16 MT = 128 mS.

The mode of operation of the control arrangement according to the invention in accordance with the flow charts of FIGS. 5 and 6 can be described as follows.

In FIG. 5, block 100 denotes the succession in the time t of the sampling periods T (125 $\mu$S) which are each characterized by the integer n. The consecutive periods are counted modulo-M and are then defined by m = n modulo M, where M is equal to, for example, 64.

Block 101 indicates that at each period T (whatever the value of M) the control arrangement tests whether an external control for resetting the coefficients to zero is detected: CRAZ = 1. When CRAZ = 1, the flow chart continues via connection 102 to FIG. 6, which will be described hereafter. If no external control for resetting the coefficients to zero is detected, the flow chart continues via block 103 which indicates the updating of the output information signals CORR and EC at each sampling period T. Updating the binary information CORR is effected as a function of the values of R(n), $N_{REC}$, $N_{AV}$, $N_{AP}$ in accordance with the criteria of formulae (1) and (4) and possibly as a function of an external control. Updating the 9-state information EC is effected as a function of the values of $N_{AV}$ and $N_{AP}$, s defined with the aid of the diagram of FIG. 4 and as a function of the internal variable TEMPO, as will become evident from the following description.

The flow chart continues via block 104 which indicates that the control arrangement tests which of the sampling periods among the sequential sampling periods are such that m = 0, which occurs at a period MT(8 ms). For sampling periods in which m = 0, the flow chart continues via connection 105 to FIG. 6 which will be described in the sequel.

For all the other sampling periods such as, those in which m≠0, block 106 indicates that the control arrangement tests whether ANTERAZ = 1. If yes, which indicates a predetection of diverging coefficients, the procedure restarts at the next sampling period (return to block 100). If ANTERAZ = 0, block 107 indicates that the control arrangement tests whether POSTRAZ = 1. If yes this indicates that an accelerated correction of the coefficients is being effected, the procedure restarts at the next sampling period (return to block 100). If POSTRAZ = 0, block 108 indicates that the control arrangement tests whether EC = 8. If yes, this indicates that the centre clipper is in the inactive state defined in the diagram of FIG. 4 by the zone $Z_8$, the information TEMPO is fixed at state 1 as is indicated by block 109, and the procedure restarts at the next sampling period.

If EC≠8, the procedure restarts at the next sampling period. It should be noted that the procedure comprising the blocks 106 and 109 renders it possible to set the information TEMPO to 1 in a double talk condition or in a condition in which the coefficients partially diverge, in accordance with what has already been described in the foregoing.

Now the portion of the flow chart shown in FIG. 6 will be described. In addition to the connections 102 and 105 already described in the foregoing, FIG. 6 is connected to FIG. 5 via connection 130 which indicates a return to the stage represented by block 100.

The information on connection 102 indicates in any sampling period the detection of an external coefficients reset-to-zero control. As an immediate result thereof, the information signals indicated in block 110 are updated and the corresponding actions are effected, that is to say RAZ = 1: resetting the coefficients to zero is instructed;
ANTERAZ = 0: the information ANTERAZ is set to zero, which might possibly indicate a convergence of the coefficients;
POSRTAZ = 1: the accelerated correction of the coefficients is instructed; and
TEMPO = 0: the information TEMPO is reset to zero.

The information on connection 105 reports the arrival of a sampling period such that m = 0. The control arrangement tests in each of these periods whether DIV = 1 in block 111.

First the branch of the flow chart in which DIV = 1 is examined, which indicates that the divergence conditions (5) and (6) of the coefficients are verified; the control arrangement tests whether ANTERAZ = 1 in block 112. If the information ANTERAZ is equal to 0, it is immediately set to 1, as is also the variable TEMPO, as indicated by block 113. The procedure then continues until the next sampling period such that m = 0. If still DIV = 1 and if ANTERAZ = 1, the control arrangement tests in block 114 whether the information TEMPO is higher than TDIV. If the information TEMPO is not higher than TDIV, it is incremented by 1. The procedure continues during subsequent sampling periods such that m = 0, until the test TEMPO > TDIV indicated in block 114 is verified. This situation having been reached, the information signals indicated in block 110 are updated and the corresponding actions are effected.

Now the flow chart branch derived from block 111 in which DIV = 0 (no instantaneous divergence of the coefficients) will be examined. The control arrangement then tests whether ANTERAZ = 1 in block 116. If yes, the information ANTERAZ is set to zero, in block 117, simultaneously with the information TEMPO. The procedure then continues until the next sampling period such that m = 0.

If ANTERAZ = 0, the control arrangement tests whether POSTRAZ = 1 in block 118. If yes, this indicates that the accelerated adjustment of the coefficients is instructed, the control arrangement tests whether CORR = 0 in block 119. The state of the information CORR is determined in the stage of the procedure represented by block 103 (FIG. 5). If CORR = 0, which indicates that the correction of the coefficients is not authorized, the procedure continues until the next sampling period such that m = 0. At that one of these periods in which the correction is authorized (CORR = 1), the control arrangement tests in block 120 whether the information TEMPO is less than TPOS, i.e. the duration of the accelerated adjustment of the coefficients. If TEMPO<TPOS, the information TEMPO is incremented by 1 (block 121) and the procedure continues during the next sampling periods when m=0, until TEMPO=TPOS. At the instant at which TEMPO=TPOS, the information POSTRAZ and at the same time the variable TEMPO are set to zero in block 122. Thus, the accelerated adjustment of the coefficients may be effected at any sampling period T, during the period TPOS defined by increments MT. After the information POSTRAZ has been set to zero, adjusting the coefficients is effected with a step having its normal operating value.

Now the flow chart branch derived from block 118 and indicating that POSTRAZ=0 will be examined. In this case, the control arrangement tests whether EC=8 in block 123. If yes, which indicates that the point having coordinates ($N_{AP}$, $N_{AV}$) is located in the zone $Z_8$, the information TEMPO is set to the 1-state (block 124) and the procedure starts again at the next sampling periods by the stage represented by block 100 which enables, in the stage represented by block 103, adjustment of the centre clipper to an inactive state.

Figure 4:
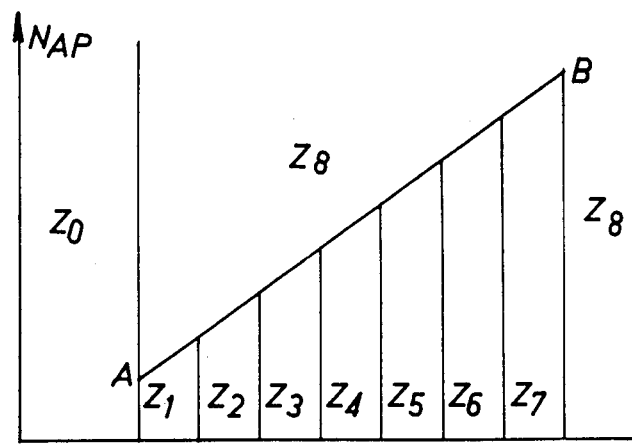
FIG. 4 is a diagram similar to that of FIG. 3, in which the zone corresponding to a control operation for enabling the centre clipper is divided into a plurality of zones corresponding to the several clipping thresholds.

If EC≠8, which indicates the situation represented by the zones $Z_1$–$Z_7$ in the diagram of FIG. 4, the control arrangement tests whether the information TEMPO is comprised between 0 and the value TEC (block 125).

If yes, the information TEMPO is incremented by 1 (block 127) and the procedure starts again in the stage represented by block 100 until the information TEMPO reaches the value TEC. At that instant the information TEMPO is set to zero (block 126). The procedure starts again at block 100 and at the stage represented by block 103 the centre clipper is driven to its active state with a non-zero clipping threshold, defined by one of the zones $Z_1$ to $Z_7$.

Figure 7:
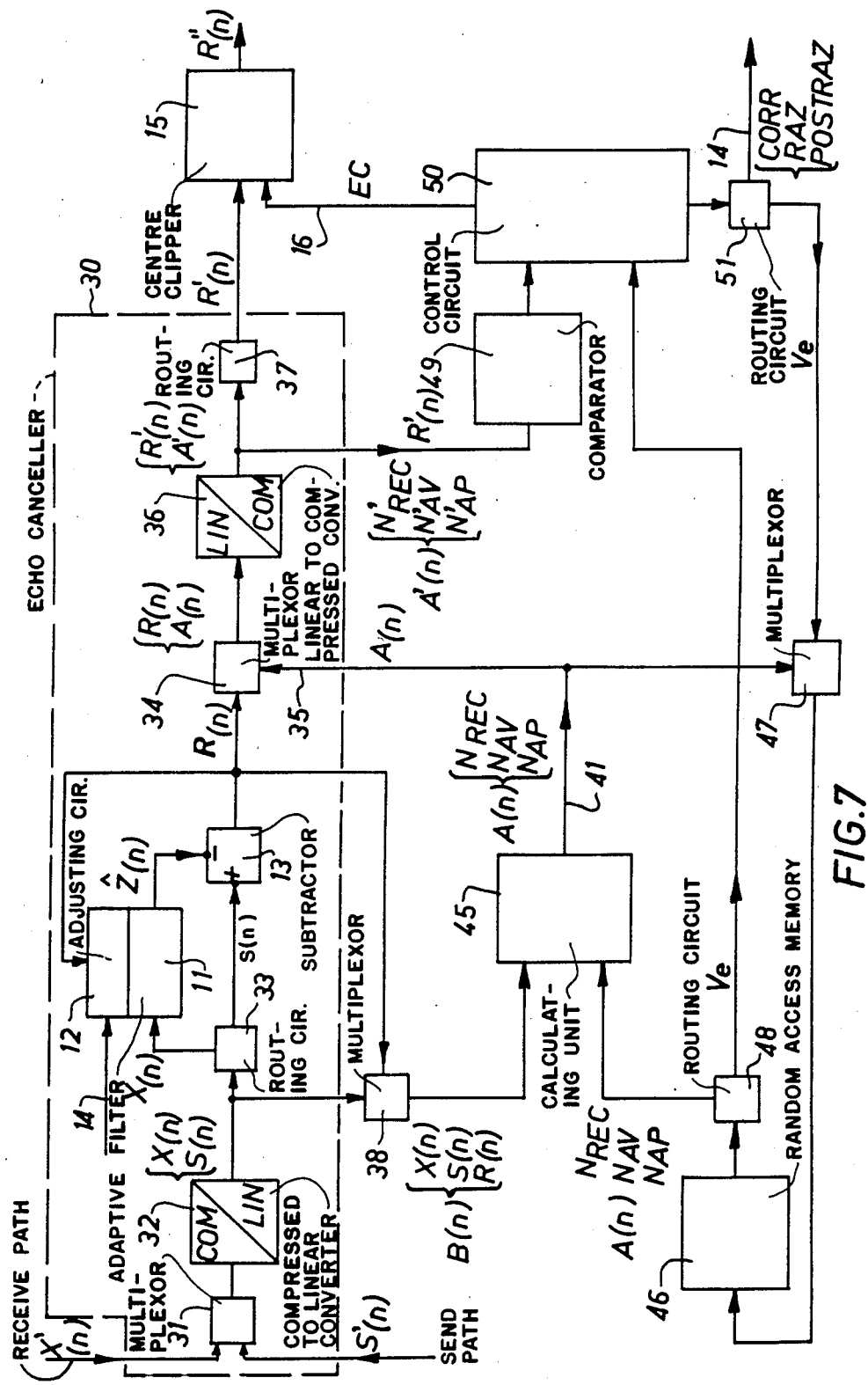
FIG. 7 is a block diagram of an advantageous embodiment of the control circuit according to the invention.

FIG. 7 shows the circuit diagram of a particularly advantageous embodiment of the control arrangement according to the invention, in which the same circuits are used to realize identical functions in the control of the echo canceller and the centre clipper. With this concept, the control arrangement may be realized economically with a reduced number of circuits. For the sake of simplicity of the circuit diagram, the generator and the connections for the timing signals necessary for the functioning of the different circuits are not shown, the characteristics of these signals and their protection being obvious to a person skilled in the art from the foregoing description.

In the circuit diagram shown in FIG. 7, the practical case is shown in which the received signals to be transmitted through the send and receive paths are digital PCM signals compressed to 8 binary elements in accordance with a standard pseudo-logarithmic encoding law (A-law or μ-law).

The actual echo canceller, which will now be described first, comprises the components shown in frame 30. It receives the digital signal X'(n) in the receive path and the digital signal S'(n) at the input of the send path. These signals which are compressed to 8 bits and whose samples occur at the sampling rate 1/T=8 kHz for a telephone path, are time-devision multiplexed with the aid of the multiplexer 31 in order to be linearized with the aid of a single converter 32 for converting a compressed signal into a linear signal. The 13-bit linear signals X(n), S(n) are applied to a routing circuit 33 in which they are separated. The signal X(n) is applied to the adaptive filter 11 of the echo canceller, which supplies an estimated value $\hat{Z}$(n) of the echo signal. The signal S(n) is applied to the positive input of the subtractor 13 whose negative input receives the signal Z(n). The subtractor 13 produces the 12-bit difference signal R(n), which is applied to the coefficients adjusting circuit 12 of the filter 11, this adjusting circuit 12 operating under the control of a control signal generated on the connection 14 by the control arrangement according to the invention. The difference signal R(n) is applied to a multiplexer 34 for time-division multiplexing with a composite 12-bit signal A(n) present on connection 35 and formed in the control arrangement as will be described in the sequel. The signal R(n) and the composite signal A(n) are converted into 8-bit compressed signals R'(n), A'(n) with the aid of a converter 36 for converting a linear signal into a compressed signal. The signal produced by the converter 36 is applied to the routing circuit 37 which takes off the signal R'(n) which constitutes, in the form of a compressed 8-bit signal, the output signal of the echo canceller. The signal R'(n), A'(n) in its totality is used in the control arrangement, as will be described hereinafter.

The 8-bit compressed signal R'(n) is applied to the centre clipper 15 which also receives the 3-bit control signal EC from the control circuit via the connection 16. The centre clipper 15 is constituted by a PROM memory which stores the samples of an 8-bit compressed signal in different addresses. With an address signal formed by the 11 bits of the two signal R'(n) and EC and serving for reading the PROM memory, the centre clipper can produce a 8-bit signal R''(n), each sample of which has the value of the signal R'(n) when the amplitude of the signal R'(n) is higher than a variable clipping threshold determined by EC, and has zero value when the amplitude of the signal R'(n) is equal to or less than this clipping threshold. The control arrangement which the echo canceller and the centre clipper have in common comprises in the first place a unit for calculating the levels $N_{REC}$, $N_{AV}$, $N_{AP}$ at each sampling period T from the samples of the linear signals X(n), S(n), R(n). To that end, these three last-mentioned signals are time-division multiplexed with the aid of a multiplexer 38 to form the multiplexed signal B(n) defined with 12 bits. The level calculating unit is formed by a rectifier followed by a recursive filter and may be based on the principles shown in FIG. 8.

Figure 8:
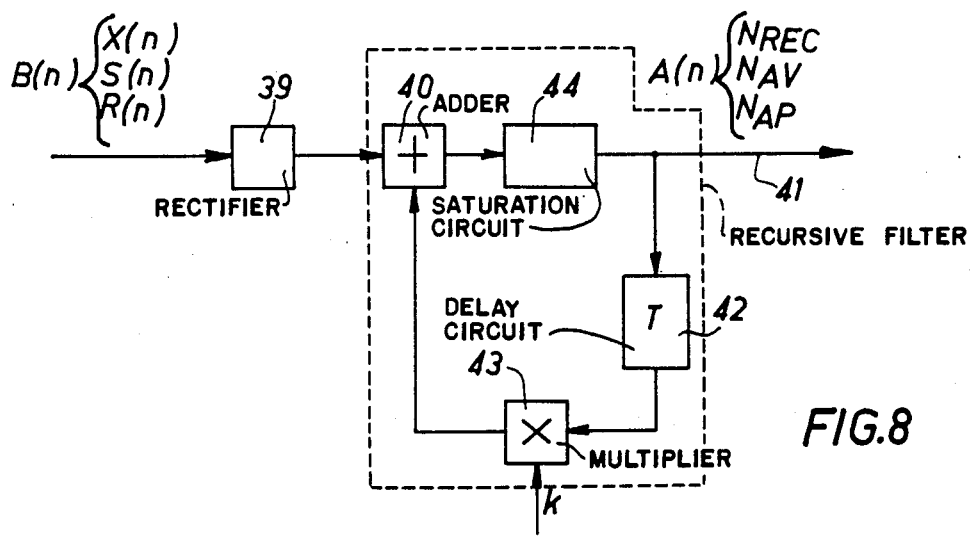
FIG. 8 is a block diagram of the unit for calculating the levels $N_{REC}$, $N_{AV}$, $N_{AP}$.

In accordance with this FIG. 8, the samples of the multiplexed signal B(n) are applied to a rectifier 39 which suppresses the sign of the samples of the signals X(n), S(n), R(n) constituting the signal B(n). The recursive filter is a first order filter and comprises an adder 40 which at one input receives the samples produced by the rectifier and at its other input samples which, before they are taken from an output 41 of the filter, are first delayed by a sampling period T with the aid of a delay circuit 42, are thereafter weighted with the coefficient k of the filter with the aid of a multiplier 43. In addition, a saturation circuit 44 which keeps the output of the filter constant above a threshold corresponding to the clipping level of the PCM signals is provided between the output of the adder 40 and the output 41 of the filter. The arrangement shown in FIG. 8 operates according to the time-sharing principle for processing a sample of each of the three signals X(n), S(n) and R(n) during a period T.

Processing the signal B(n) shown in FIG. 8 can in practice be realized in accordance with the circuit diagram of FIG. 7, by applying the signal B(n) to a calculating unit 45, in which the calculation operations shown in FIG. 8 are effected in time-sharing, which operations are basically a suppression of the sign of the samples realized by circuit 39, an adding operation effected by circuit 40, a saturation operation effected by circuit 44 and finally a multiplying operation effected by circuit 43, which multiplying operation can be a simple shift operation when the coefficient k of the filter has the shape $a=(1-2^p)$, where p is an integer. The output of the calculation unit 45 constitutes the output 41 of the filter at which there appears the signal A(n) having, for example, 16 bits and being the result of the time-division multiplexing of the calculated levels $N_{REC}$, $N_{AV}$ and $N_{AP}$. A random-access memory 46 enabled by the appropriate read and write signals, renders it possible to provide the delay function T of circuit 42 in FIG. 8. Its input is connected to the output 41 of the calculating unit via a multiplexer 47, which allows a signal $V_e$ which will be further described in the sequel to be also applied to the input of the memory. The output of random-access memory 46 is connected to a routing circuit 48 which separates the signals read from the memory into two paths. The one path conveying the level signals $N_{REC}$, $N_{AV}$, $N_{AP}$ is connected to a second input of calculating unit 45. The other output path of routing circuit 48 conveys the signal $V_e$ which is used as described hereinafter.

The signal A(n) produced by calculating unit 45 is consequently formed of the time-shared level signals $N_{REC}$, $N_{AV}$, $N_{AP}$, these level signals being linear signals. To enable ready comparisons of the levels, these level signals forming the signal A(n) are applied with 12 bits, via multiplexer 34, to converter 36 for converting a linear signal into a compressed signal, this converter having already been used in the echo canceller for converting the linear signal R(n) produced by the echo canceller into the compressed signal R'(n).

The signal supplied by converter 36 and formed by the compressed time-shared signals R'(n), N'$_{REC}$, N'$_{AV}$, N'$_{AP}$ is applied to a comparator unit 49. In this unit 49, there are effected in each sampling period the comparisons of the signals R'(n), N'$_{REC}$, N'$_{AV}$, N'$_{AP}$ with each other or the comparisons of these signals with six thresholds. The comparisons to be effected are determined, as already described in the foregoing, by the diagram of FIG. 4 for controlling the centre clipper and by the formulae (1) to (6) for controlling the echo canceller, taking account of the fact that the signals to be compared are compressed in accordance with a semilogarithmic law. The comparisons effected in unit 49 result in an 8-bit information signal, 4 bits forming the information intended for the control of the centre clipper and the 4 other bits constituting the information intended for the control of the echo canceller. The comparator unit 49 may basically be realized with the aid of a PROM memory in which the possible configurations of the 8-bit output information signal are stored at different addresses. The signal A'(n) is applied to the PROM memory to read from appropriate addresses the configuration of the output signal corresponding to the signals constituting the signal A'(n).

The 8-bit signal supplied at each sampling instant nT by the comparator unit 49 is applied to a decision unit 50 which performs the procedure described with reference to the flow chart of FIGS. 5 and 6. The decision unit 50 also receives at each sampling instant the 6-bit signal $V_e$, formed by the information signals ANTERAZ, POSTRAZ, TEMPO, whose roles have been described in the foregoing and which were produced and stored in the memory 46 at a preceding instant. The decision unit 50 applies the 3-bit signal EC for controlling the centre clipper to the connection 16. It also applies to the input of a routing circuit 51 a signal comprising the information required for controlling the echo canceller and the information signal $V_e$ to be temporarily stored in memory 46. The routing circuit 51 conveys a 3-bit signal comprising the information signals CORR, RAZ and POSTRAZ, whose roles have been described in the foregoing, to the connection 14 to the coefficients adjusting circuit 12. The routing circuit 51 also conveys the 6-bit signal $V_e$ to the input of random-access memory 46 via multiplexer 47. The decision unit 50 operating in accordance with the procedure described by the flow charts of FIGS. 5 and 6, can be realized by means of, for example, some logic gates and a PROM memory, with a lay-out which is obvious to a person skilled in the art.

What is claimed is:

1. Apparatus for controlling an echo canceller and a centre clipper, in a telephone circuit, comprising:
   a. a receive path for transmitting a receive signal having a level $N_{REC}$; and
   b. a send path for transmitting a send signal having a level $N_{AV}$, in which send path there is an echo signal of the receive signal;
   c. the echo canceller including:
      i. an adaptive filter, coupled with the receive path, having an output signal, and containing coefficients for approximately the echo signal; and
      ii. a subtractor connected in the send path, for subtracting the output signal of the adaptive filter from the send signal, the subtractor having an output with a level $N_{AP}$ and coupled to a first input of the centre clipper;
      iii. an adjusting circuit coupled with the adaptive filter for automatically adjusting the coefficients so that the adaptive filter supplies an approximated echo signal;
   d. a control arrangement having first and second outputs at which a centre clipper control signal and an adjusting circuit control signal, respectively, are provided, the control arrangement including:
      i. means for comparing:
         1. $N_{AV}$ to two fixed levels $N_{AV0}$ and $N_{AV1}$; and
         2. $N_{AP}/N_{AV}$ to a threshold a; and
      ii. a decision unit, responsive to the means for comparing, supplying the adjusting circuit control signal at the second output and supplying the centre clipper control signal at the first ouput so that the centre clipper control signal activates the centre clipper according to a clipper threshold, when the means for comparing indicates that $N_{AV}$ is between $N_{AV0}$ and $N_{AV1}$ and when the means for comparing indicates that $N_{AP}/N_{AV}$ is less than a.

2. The apparatus of claim 1 wherein the control arrangement further comprises means for varying the clipping threshold as a function of $N_{AV}$.

3. The apparatus of claim 1 wherein the control arrangement further comprises means for varying the threshold a as a function of $N_{AV}$.

4. An apparatus for controlling an echo canceller and a centre clipper, for use in a telephone circuit which includes:
   a. a receive path for transmitting a receive path having a level $N_{REC}$;

b. a send path for transmitting a send signal having a level $N_{AV}$, in which send path there is an echo signal of the receive signal;

c. an adaptive filter, coupled with the receive path, having an output signal, and containing coefficients for approximating the echo signal;

d. a subtractor connected in the send path for subtracting the output signal of the adaptive filter from the send signal, the subtractor having an output with a level $N_{AP}$ coupled to a first input of the center clipper; and e. an adjusting circuit coupled with the adaptive filter for automatically adjusting the coefficients so that the adaptive filter supplies an approximated echo signal;

wherein the apparatus for controlling comprises:

f. a control arrangement having first and second outputs at which a centre clipper control signal and an adjusting circuit control signal, respectively, are provided, the control arrangement including:

i. means for comparing:

1. $N_{AV}$ to two fixed levels $N_{AV0}$ and $N_{AV1}$; and

2. $N_{AP}/N_{AV}$ to a threshold a; and ii. a decision unit, responsive to the means for comparing, supplying the adjusting circuit control signal at the second output and supplying the center clipper control signal at the first ouput so that the center clipper control signal activates the centre clipper according to a clipping threshold when the means for comparing indicates that $N_{AV}$ is between $N_{AV0}$ and $N_{AV1}$ and when the means for comparing indicates that $N_{AP}/N_{AV}$ is less than a.

5. The apparatus of claim 4 wherein the control arrangement comprises means for varying the clipping threshold as a function of $N_{AV}$.

6. The apparatus of claim 4 wherein the control arrangement comprises means for varying the threshold a as a function of $N_{AV}$.

7. The apparatus of claim 4 wherein: the means for comparing further compares $N_{AV}$ to a plurality of fixed levels between $N_{AV0}$ and $N_{AV1}$, each of the plurality of fixed levels corresponding to one of a plurality of consecutive ranges for $N_{AV}$, the clipping threshold being assigned a non-zero value which varies with $N_{AV}$ for each range, and wherein:

the centre clipper control signal includes one of the non-zero clipping thresholds to activate the center clipper or a zero clipping threshold to inactivate the center clipper.

8. The apparatus of claim 4 wherein the control arrangement comprises means for delaying activation of the centre clipper for a predetermined period of time.

9. The control arrangement of claim 4 wherein:

A. the means for comparing further compares:

1. an amplitude $|R(n)|$ of the receive signal to a given $R_o$;

2. a ratio $|R(n)|/N_{REC}$ to a given threshold b; and

3. $N_{REC}$ to two fixed levels $N_{REC0}$ and $N_{REC1}$; and wherein

B. the adjusting circuit control signal directs the adjusting circuit to correct the coefficients when simultaneously:

$|R(n)| > R_o$;

$|R(n)|/N_{REC} > b$; and $N_{REC0} < N_{REC} < N_{REC1}$.

10. The apparatus of claim 4 wherein:

A. the means for comparing further compares:

1. a ratio $N_{AV}/N_{REC}$ to a given threshold c; and 2. a ratio $N_{AP}/N_{AV}$ to a given threshold d; and wherein B. the adjustment circuit control signal directs the adjusting circuit to correct the coefficients when simultaneously:

$N_{AV}/N_{REC} > c$; and $N_{AP}/N_{AV} > d$.

11. The apparatus of claim 4 wherein:

A. the means for comparing further compares:

1. the ratio $N_{AP}/N_{AV}$ to a threshold $1+\epsilon$, $\epsilon$ being small relative to 1; and 2. the level $N_{AV}$ to a fixed level $N_{AV2}$;

B. the adjusting circuit control signal directs the adjusting circuit to set the coefficient to zero when simultaneously:

$N_{AP}/N_{AV} > 1+\epsilon$; and $N_{AV} > N_{AV2}$;

so that the coefficients are set to zero when a coefficient divergence state is detected during a predetermined period of time.

12. The apparatus of claim 11 comprising means for increasing a rate of adjustment of the coefficients during a second predetermined period of time after the coefficients have been set to zero.

13. The apparatus of claim 4 comprising:

A. an input converter disposed within the echo canceller for converting a first compressed signal into a first linear signal;

B. an output converter disposed within the echo canceller for converting a second linear signal into a second compressed signal;

C. first means disposed within the echo canceller for time sharing said input converter so that it both: converts a compressed send signal $S'(n)$ into a linear send signal $S(n)$; and converts a compressed receive signal $X'(n)$ into a linear receive signal $X(n)$;

D. a calculating unit having as inputs linear signals $X(n)$, $S(n)$, an output from the subtracter $R(n)$, $N_{REC}$, $N_{AV}$, and $N_{AP}$ and having as outputs $N_{REC}$, $N_{AV}$, $N_{AP}$;

E. second means disposed within the echo canceller for time sharing said output converter so that it both: converts the linear signal $R(n)$ into a compressed signal $R'(n)$ input to the centre clipper; and converts the linear signals $N_{REC}$, $N_{AV}$, and $N_{AP}$ output from the calculating unit to compressed signals $N'_{REC}$, $N'_{AV}$, and $N'_{AP}$ to be input to the means for comparing.

14. The control arrangement of claim 13 wherein

F. the means for comparing comprises a comparator for effecting during a sampling period all comparisons necessary for controlling the adjustng circuit and having an output at which the results of the comparisons are supplied;

G. the control arrangement further comprising a decision unit coupled with the output of the comparator, the decision unit having an output at which at least the following are supplied:
  i. a first signal having a first state enabling correction of the coefficient and a second state inhibiting the correction of the coefficients;
  ii. a second signal having a first state enabling an increase in a coefficient adjustment rate and having a second state inhibiting the increase in the coefficient adjustment rate;
  iii. a third signal having a first state enabling resetting the coefficients to zero and a second state inhibiting the resetting of the coefficient to zero;
  iv. a fourth signal controlling the clipping threshold, and enabling one of activation and inactivation of the centre clipper.

15. The control arrangement of claim 14 wherein the comparator compares:
  I. an amplitude $|R(n)|$ of the receive signal to a given level $R_0$;
  II. a ratio $|R(n)|/N_{REC}$ to a given threshold b;
  III. $N_{REC}$ to two fixed levels $N_{REC0}$ and $N_{REC1}$;
  IV. a ratio $N_{AV}/N_{REC}$ to a given threshold c;
  V. the ratio $N_{AP}/N_{AV}$ to a given threshold d;
  VI. a ratio $N_{AP}/N_{AV}$ to a threshold $1+\epsilon$, $\epsilon$ being small relative to 1; and
  VII. $N_{AV}$ to a fixed level $N_{AV2}$.

16. The control arrangement of claim 14 wherein the decision unit comprises sequential logic, said sequential logic using a single incrementable bit string to determine;
  H. passage of a first time period for detecting a coefficient divergence state, the coefficients being set to zero at the end of said first time period;
  I. passage of a second time period for increasing a coefficient adjustment rate; and
  J. passage of a third time period for delaying activation of the centre clipper;
  said sequential logic comprising means for incrementing the single incrementable bit string with a period longer than the sampling period.

17. The control arrangement of claim 16 comprising:
  K. means: for setting the second signal to its first state, for setting the third signal to its first state, and for setting the single incrementable bit string to zero, when the coefficient divergence state is detected and the single incrementable bit string exceeds the first time period;
  L. means for setting the second signal to its second state and for setting the single incrementable bit string to zero, when the coefficient divergence state is not detected, the first signal is at its first state, and the single incrementable bit string is greater than the second time period; and
  M. means for activating the centre clipper in response to the fourth signal and for setting the single incrementable bit string to zero, when the coefficient divergence state is not detected, the single incrementable bit string reaches the third time period and an instruction to increase the coefficient adjustment rate is in progress, and the first signal is in its first state.

18. The control arrangement of claim 17 wherein the comparator consists essentially of a PROM memory addressable by the levels $R'(n)$, $N'_{REC}$, $N'_{AV}$, and $N'_{AP}$ with addressable locations for storing possible comparison results.

* * * * *

UNITED STATES PATENT AND TRADEMARK OFFICE
CERTIFICATE OF CORRECTION

PATENT NO. : 4,679,230

DATED : July 7, 1987

INVENTOR(S) : Jean Lassaux, et al

It is certified that error appears in the above-identified patent and that said Letters Patent is hereby corrected as shown below:

Col. 16, claim 1, line 11, change "approximately" to --approximating--

Col. 16, claim 1, line 33, change "clipper" to --clipping--(2nd occurr)

Col. 16, claim 4, line 4, change "path" to --signal-- (2nd occurr)

Col. 18, claim 11, line 7, change "coefficients-- to --coefficients--

Col. 18, claim 14, line 4, change "adjustng" to --adjusting--

Signed and Sealed this

First Day of January, 1991

*Attest:*

HARRY F. MANBECK, JR.

*Attesting Officer*      *Commissioner of Patents and Trademarks*